(12) United States Patent
Evans et al.

(10) Patent No.: US 6,686,934 B1
(45) Date of Patent: Feb. 3, 2004

(54) METHODS AND ARRANGEMENTS FOR PROVIDING A DISCOVERABLE PLURAL MODE SYSTEM SHUT DOWN GRAPHICAL USER INTERFACE CAPABILITY

(75) Inventors: Christopher A. Evans, Redmond, WA (US); Giampiero M. Sierra, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/557,183

(22) Filed: Apr. 21, 2000

Related U.S. Application Data
(60) Provisional application No. 60/170,957, filed on Dec. 15, 1999.

(51) Int. Cl.[7] .................................................. G06F 3/00
(52) U.S. Cl. ........................ 345/764; 345/711; 345/810; 345/712
(58) Field of Search ................................. 345/711, 764, 345/810, 168, 172, 211, 212; 713/320, 321, 323, 324

(56) References Cited

U.S. PATENT DOCUMENTS

| | | | | | |
|---|---|---|---|---|---|
| 5,623,261 | A | * | 4/1997 | Rose | 341/26 |
| 5,920,728 | A | * | 7/1999 | Hallowell et al. | 713/340 |
| 6,101,610 | A | * | 8/2000 | Beebe et al. | 713/323 |

OTHER PUBLICATIONS

Introducing Microsoft Windows 95, 1995, Microsoft Corporation, p. 17, p. 44.*

* cited by examiner

*Primary Examiner*—John Cabeca
*Assistant Examiner*—Kieu D. Vu
(74) *Attorney, Agent, or Firm*—Lee & Hayes, PLLC

(57) ABSTRACT

Methods and arrangements are provided that display a shut down mechanism within a graphical user interface on a display device. The shut down mechanism is normally operatively associated with a first shut down function, but can be operatively associated with other functions based upon on modifier input(s).

36 Claims, 3 Drawing Sheets

METHODS AND ARRANGEMENTS FOR PROVIDING A DISCOVERABLE PLURAL MODE SYSTEM SHUT DOWN GRAPHICAL USER INTERFACE CAPABILITY

This application claims priority from U.S. Provisional Application Serial No. 60/170,957, filed Dec. 15, 1999, titled "UI Reflection of Command Change Based on Modifier Key State", the disclosure of which is incorporated by reference herein.

TECHNICAL FIELD

This invention relates to computers and software, and more particularly to methods and arrangements that provide discoverable plural mode system shut down graphical user interface (GUI) capabilities suitable for users having different computing experiences.

BACKGROUND OF THE INVENTION

Computers can be used in single user environments and multiple user environments. In either of these environments, one can find computer users of varying skills, from the novice to the expert. These various users tend to prefer different interface capabilities. For example, a novice personal computer (PC) user will more likely prefer a less complicated interface, especially one that prevents them from harming the computer system in some manner. To the contrary, an experienced PC programmer may want an interface that provides access to various critical system data files. To meet this need computer operating system developers tend to hide certain tools/files from the novice user.

In multiple user environments, there may be occasions where novice users share a computer with more advanced users. While such environments may be configured to control each user's access capabilities and partition or otherwise separate user's files/data, there are still a few potential problems. One potential problem involves the shutting down of the computer.

Traditional operating systems tend to offer the user a variety of shut down modes. For example, a computer can be placed in a stand-by mode, restarted, restarted using a different operating system, completely powered down, etc. The user typically selects between such shut down modes. Novice users, however, may not fully understand the ramifications of the various shut down modes. Thus, for example, if a user shuts down the computer using the wrong mode, then there is a chance that one or more of the other users may lose data.

Thus, there is a need to provide an improved user interface mechanism that supports novice and advanced users in multiple user desktop/space operating environments.

SUMMARY OF THE INVENTION

An improved user interface mechanism that supports novice and advanced users in multiple user desktop/space operating environments is provided in the form of various methods and arrangements.

The above stated needs and others are met, for example, by displaying a shut down mechanism within a graphical user interface on a display device. The shut down mechanism is normally operatively associated with a first shut down function, but can be operatively associated with at least a second shut down function based upon on a modifier input. Thus, for example, the shut down mechanism may, by default, be operatively associated with a hibernate function. When selected by the user, the shut down mechanism will initiate a hibernate function. The user need not be aware that this is the actual function being conducted. Should the user have the need, however, the shut down mechanism can be operatively associated with a plurality of other shut down functions. This capability is discoverable within the graphical user interface and more likely to be discovered and of interest to advanced users. For example, by holding down the SHIFT key on a keyboard the shut down mechanism will dynamically change in some manner that tells the user that a different shut down function can be initiated by selecting the shut down mechanism. Thus, while holding down the SHIFT key to the shut down mechanism can be operatively associated with a restart function. In another example, while holding down the CTRL key the shut down mechanism can be operatively associated with a complete shut down function.

In this manner, both novice and advanced users are able to more successfully operate and/or share a computer.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
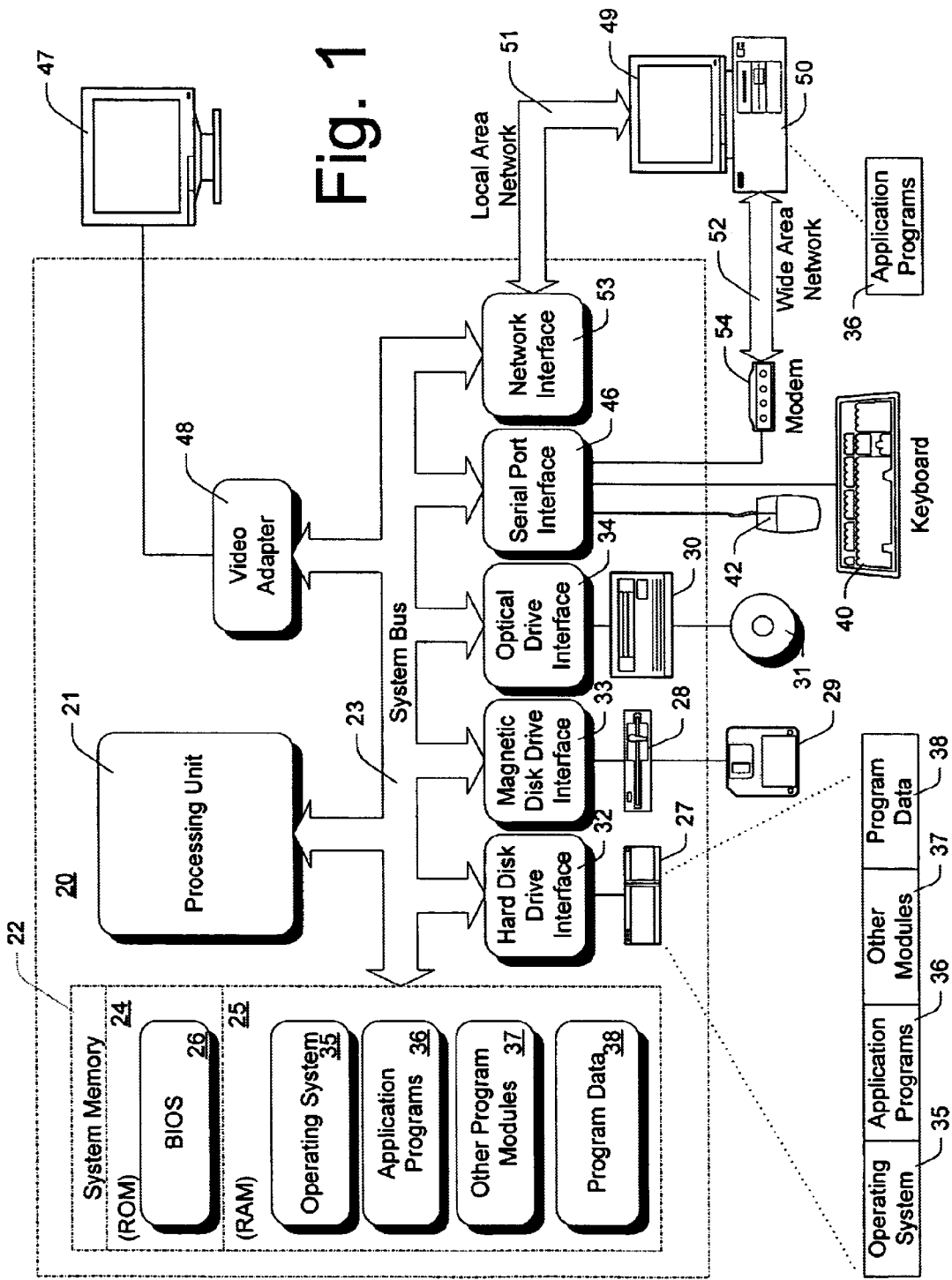
FIG. 1 is a block diagram depicting an exemplary computer system suitable for use in the inputting and the outputting of user reminder information.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
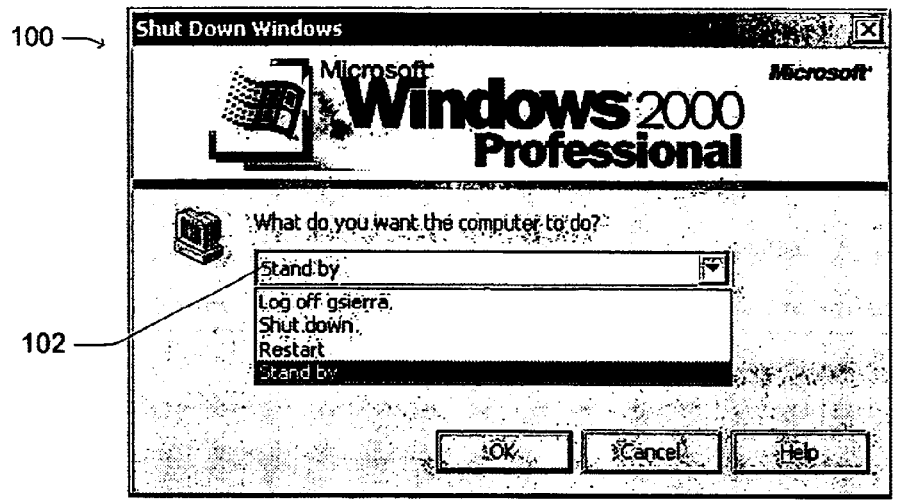
FIG. 2 depicts a conventional menu-driven shut down selection mechanism.

Reference is now made to FIG. 2, which depicts a conventional menu-driven shut down selection mechanism 100. As shown, shut down selection mechanism 100 presents the user with a variety of selectable shut down modes through selection field 102. As mentioned above, one of the drawbacks to this type of shut down mechanism in a multiple user environment is that novice users may unintentionally shut down the computer in a way that causes other user's data to be lost. Another problem is having this many options may simply confuse novice users since they may not always have the experience or knowledge to differentiate between the various shut down options.

Figure 3:
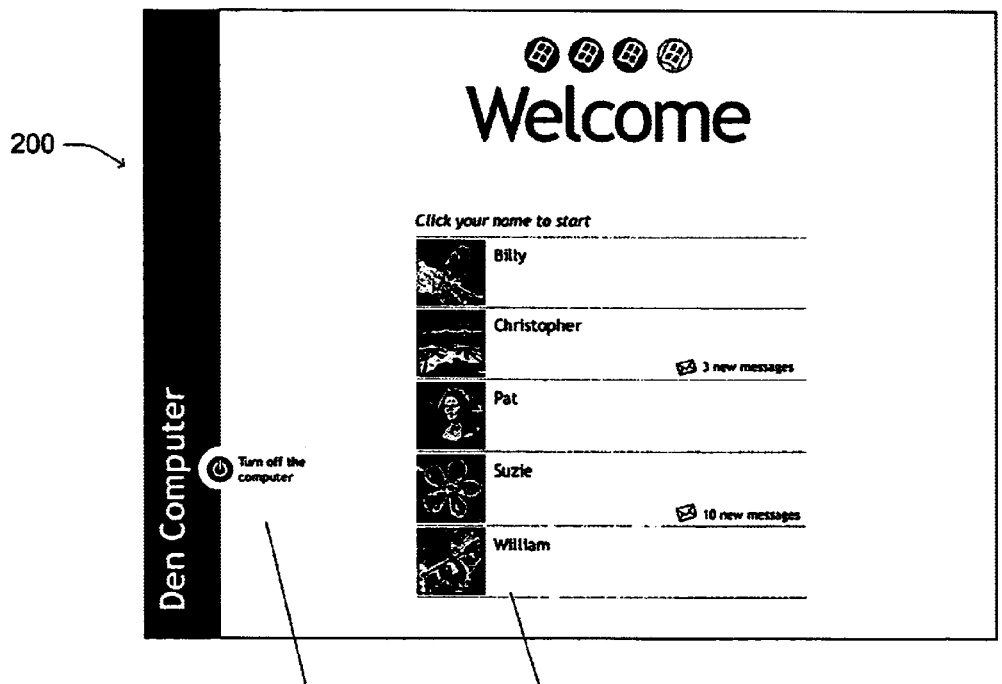
FIG. 3 depicts a graphical user interface having an improved shut down selection mechanism.
Figure 4A:
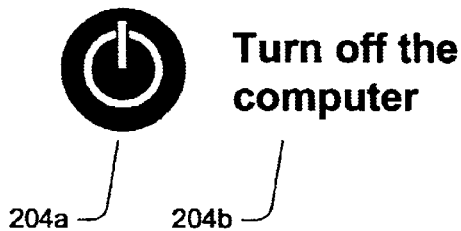
FIG. 4(a) depicts the improved shut down selection mechanism of FIG. 3, as presented without modification to the user.
Figure 4B:
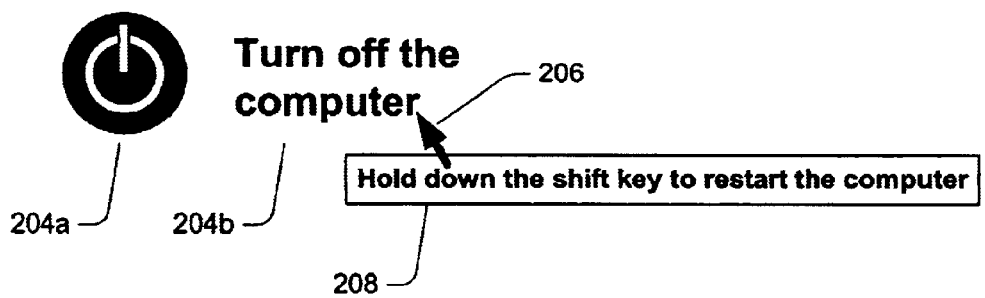
FIG. 4(b) depicts the improved shut down selection mechanism of FIG. 4(a) during a discoverable selection process.
Figure 4C:
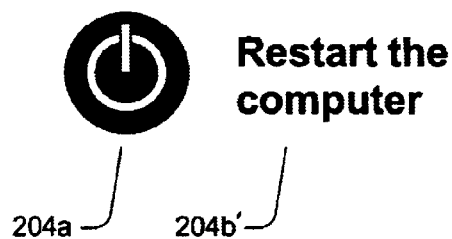
FIG. 4(c) depicts the improved shut down selection mechanism of FIG. 3 during a first modified selection process.
Figure 4D:
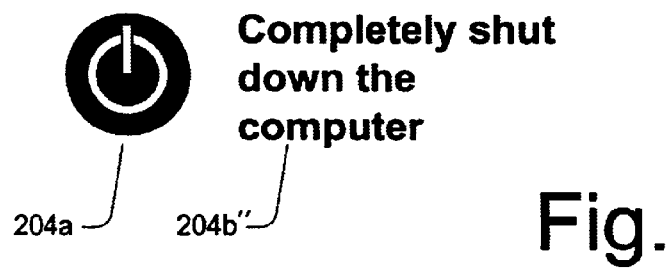
FIG. 4(d) depicts the improved shut down selection mechanism of FIG. 3 during a second modified selection process.

FIG. 3 depicts a graphical user interface having an improved shut down selection mechanism. Here, a welcome screen 200 is shown as having a multiple user logon mechanism 202 and a shut down mechanism 204. Logon mechanism 202 is a user selectable listing of users configured to access the computer resources. Shut down mechanism 204, in this example, is a graphical selectable region within welcome screen 200 that is operatively associated with a plurality of shut down modes.

FIG. 4(*a*) depicts shut down mechanism 204 of FIG. 3, as presented without modification to the user within welcome screen 200. In this example, the user is presented with a button 204*a* and shut down mode description 204*b*. The user can point and click on either 204*a* or 204*b* to initiate a default shut down mode. In the case of a multiple user environment, one of the default shut down modes is a hibernate mode. In the hibernate mode, the entire contents of the memory are written to a disk drive or like device and then computer 20 is shut down. When computer 20 is powered up at a later time, the operating system restores the entire contents to memory from the disk drive such that computer 20 is essentially back to the state where it was before it was shut down. From the perspective of a novice user, the shut down mode just shuts down the computer. However, since other user's data and files have been safeguarded, there is no loss.

FIG. 4(*b*) depicts shut down mechanism 204 of FIG. 3 during a discoverable selection process. Here, a user may discover additional selectable modifications that cause shut down mechanism 204 to initiate other shut down mode functions. In this example, a user has positioned a pointer 206 over shut down mode description 204*b*. After a defined period of time, for example, about 1 second or so, a tool tip 208 is displayed. In this example, tool tip 208 tells the user to hold down the shift key to restart computer 20. Restarting computer 20 causes computer 20 to reboot.

Thus, these and other modifiable functions are discoverable to users through tool tip 208. Once a user has discovered or otherwise notified that shut down mechanism 204 can be modified through the use of a modifier input, such as, for example, a SHIFT key, CTRL key, RIGHT mouse button, etc., then the user can initiate other shut down functions. This makes the behavior of the shut down mechanism 204, or other types of mechanisms/buttons, fully discoverable and predictable.

For example, FIG. 4(*c*) depicts shut down mechanism 204 of FIG. 3 during a first modified selection process, when the SHIFT key on keyboard 40 is held down. As shown, shut down mode description 204*b* has dynamically changed to shut down mode description 204*b*' to reflect the modified shut down function that can be selected by shut down mechanism 204 with the SHIFT key held down.

Is Here, shut down mode description 204*b*' tells the user that selecting button 204*a* with the SHIFT key held down will cause the computer to restart.

FIG. 4(*d*) depicts an example of shut down mechanism 204 of FIG. 3 during a second modified selection process when the CTRL key on keyboard 40 is held down. As shown, shut down mode description 204*b* has dynamically changed to shut down mode description 204*b*" to reflect the modified shut down function that can be selected by shut down mechanism 204 with the CTRL key held down. Here, shut down mode description 204*b*" tells the user that selecting button 204*a* with the SHIFT key held down will cause the computer to completely shut down (i.e., without hibernating, etc.).

Those skilled in the art will recognize that by dynamically changing shut down mode description 204 to reflect the modified shut down function, users will be able to verify that the proper shut down process is about to occur. Moreover, shut down mode mechanism 204 will appear to the novice user as the only and correct decision to make when shutting down computer 20. Advanced users can discover and access the additional shut down functions available by combining user inputs while selecting shut down mechanism 204, as needed.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
    displaying a shut down mechanism within a graphical user interface on a display device;
    operatively associating the shut down mechanism with a first shut down function;
    causing the shut down mechanism to only identify the first shut down function while operatively associated with the first shut down function;
    operatively associating the shut down mechanism with a second shut down function based upon on a modifier input, wherein the modifier input is identified to the user through a discoverable portion of the shut down mechanism that is graphically displayed based on a position of a graphical pointing input during a defined period of time; and
    upon operatively associating the shut down mechanism with the second shut down function, causing the shut-down mechanism to only identify the second shut down function.

2. The method as recited in claim 1, wherein displaying the shut down mechanism within the graphical user interface on the display device further includes displaying a user selectable graphical element and a dynamically determinable shut down function identifier.

3. The method as recited in claim 2, wherein operatively associating the shut down mechanism with the first shut down function further includes uniquely identifying the first shut down function using the dynamically determinable shut down function identifier.

4. The method as recited in claim 2, wherein operatively associating the shut down mechanism with the second shut down function based upon on the modifier input further includes uniquely identifying the second shut down function using the dynamically determinable shut down function identifier.

5. The method as recited in claim 1, wherein the modifier input includes at least one keyboard initiated input.

6. The method as recited in claim 5, wherein the modifier input includes a SHIFT key input.

7. The method as recited in claim 5, wherein the modifier input includes a CTRL key input.

8. The method as recited in claim 1, wherein the modifier input includes at least one mouse initiated input.

9. The method as recited in claim 1, wherein the first shut down function includes a hibernate function.

10. The method as recited in claim 1, wherein the second shut down function includes a restart function.

11. The method as recited in claim 1, wherein the second shut down function includes a complete shut down function.

12. The method as recited in claim 1, wherein the graphical user interface includes mark-up language based graphical features.

13. A computer-readable medium having computer-executable instructions for causing at least one processing unit to perform acts comprising;
    displaying a shut down mechanism within a graphical user interface on a display device;
    operatively associating the shut down mechanism with a first shut down function;
    causing the shut down mechanism to only identify the first shut down function while operatively associated with the first shut down function;
    operatively associating the shut down mechanism with a second shut down function based upon on a modifier input, wherein the modifier input is identified to the user through a discoverable portion of the shut down mechanism that is graphically displayed based on a position of a graphical pointing input during a defined period of time; and
    upon operatively associating the shut down mechanism with the second shut down function, causing the shut down mechanism to only identify the second shut down function.

14. The computer-readable medium as recited in claim 13, wherein displaying the shut down mechanism within the graphical user interface on the display device further includes displaying a user selectable graphical element and a dynamically determinable shut down function identifier.

15. The computer-readable medium as recited in claim 14, wherein operatively associating the shut down mechanism with the first shut down function further includes uniquely identifying the first shut down function using the dynamically determinable shut down function identifier.

16. The computer-readable medium as recited in claim 14, wherein operatively associating the shut down mechanism with the second shut down function based upon on the modifier input further includes uniquely identifying the second shut down function using the dynamically determinable shut down function identifier.

17. The computer-readable medium as recited in claim 13, wherein the modifier input includes at least one keyboard initiated input.

18. The computer-readable medium as recited in claim 17, wherein the modifier input includes a SHIFT key input.

19. The computer-readable medium as recited in claim 17, wherein the modifier input includes a CTRL key input.

20. The computer-readable medium as recited in claim 13, wherein the modifier input includes at least one mouse initiated input.

21. The computer-readable medium as recited in claim 13, wherein the first shut down function includes a hibernate function.

22. The computer-readable medium as recited in claim 13, wherein the second shut down function includes a restart function.

23. The computer-readable medium as recited in claim 13, wherein the second shut down function includes a complete shut down function.

24. The computer-readable medium as recited in claim 13, wherein the graphical user interface includes mark-up language based graphical features.

25. An arrangement comprising:

at least one user input device;

a display device; and a processor operatively coupled to the user input device and the display device and configured to display a shut down mechanism within a graphical user interface on the display device, operatively associate the shut down mechanism with a first shut down function such that the shut down mechanism only identifies the first shut down function while operatively associated with the first shut down function, and operatively associate the shut down mechanism with a second shut down function based upon on a modifier input, and wherein the modifier input is identified to the user through a discoverable portion of the shut down mechanism that is graphically displayed based on a position of a graphical pointing input during a defined period of time, and wherein, upon operatively associating the shut down mechanism with the second shut down function, the shut down mechanism only identifies the second shut down function.

26. The arrangement as recited in claim 25, wherein the processor is further configured to display the shut down mechanism by displaying a user selectable graphical element and a dynamically determinable shut down function identifier.

27. The arrangement as recited in claim 26, wherein the processor is further configured to operatively associate the shut down mechanism with the first shut down function by uniquely identifying the first shut down function using the dynamically determinable shut down function identifier.

28. The arrangement as recited in claim 26, wherein the processor is further configured to operatively associate the shut down mechanism with the second shut down function by uniquely identifying the second shut down function using the dynamically determinable shut down function identifier.

29. The arrangement as recited in claim 25, wherein the modifier input includes at least one keyboard initiated input.

30. The arrangement as recited in claim 29, wherein the modifier input includes a SHIFT key input.

31. The arrangement as recited in claim 29, wherein the modifier input includes a CTRL key input.

32. The arrangement as recited in claim 25, wherein the modifier input includes at least one mouse initiated input.

33. The arrangement as recited in claim 25, wherein the first shut down function includes a hibernate function.

34. The arrangement as recited in claim 25, wherein the second shut down function includes a restart function.

35. The arrangement as recited in claim 25, wherein the second shut down function includes a complete shut down function.

36. The arrangement as recited in claim 25, wherein the graphical user interface includes mark-up language based graphical features.

* * * * *

UNITED STATES PATENT AND TRADEMARK OFFICE
CERTIFICATE OF CORRECTION

PATENT NO. : 6,686,934 B1
DATED : February 3, 2004
INVENTOR(S) : Evans et al.

It is certified that error appears in the above-identified patent and that said Letters Patent is hereby corrected as shown below:

Column 4,
Line 56, delete "Is" before "Here".

Signed and Sealed this

Twenty-second Day of June, 2004

JON W. DUDAS
*Acting Director of the United States Patent and Trademark Office*